March 4, 1952     D. PACKARD ET AL     2,587,755
FREQUENCY MEASURING OR INDICATING APPARATUS
Filed March 6, 1948     2 SHEETS—SHEET 1
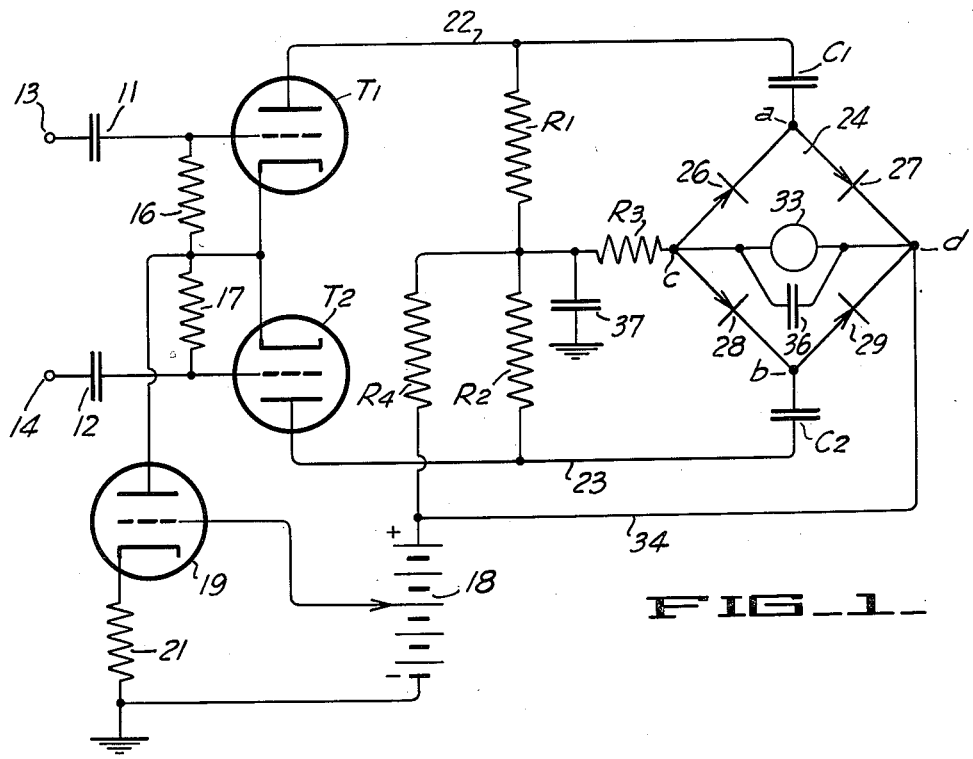
FIG_1_
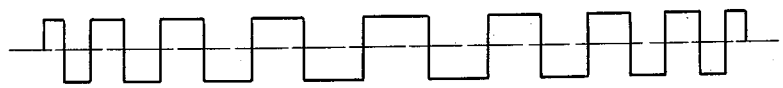
FIG_2_
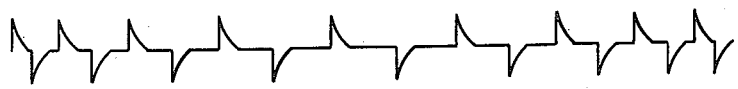
FIG_3_
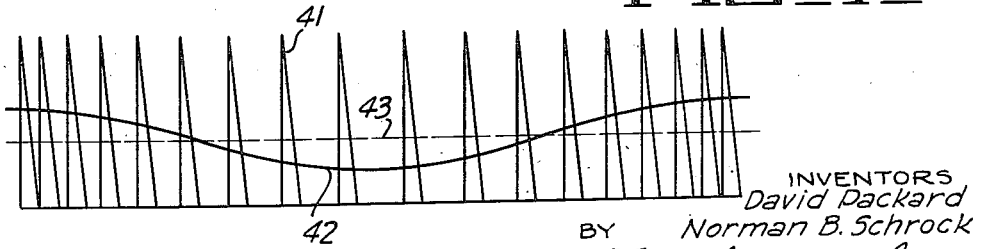
FIG_4_
INVENTORS
David Packard
Norman B. Schrock
BY
ATTORNEYS

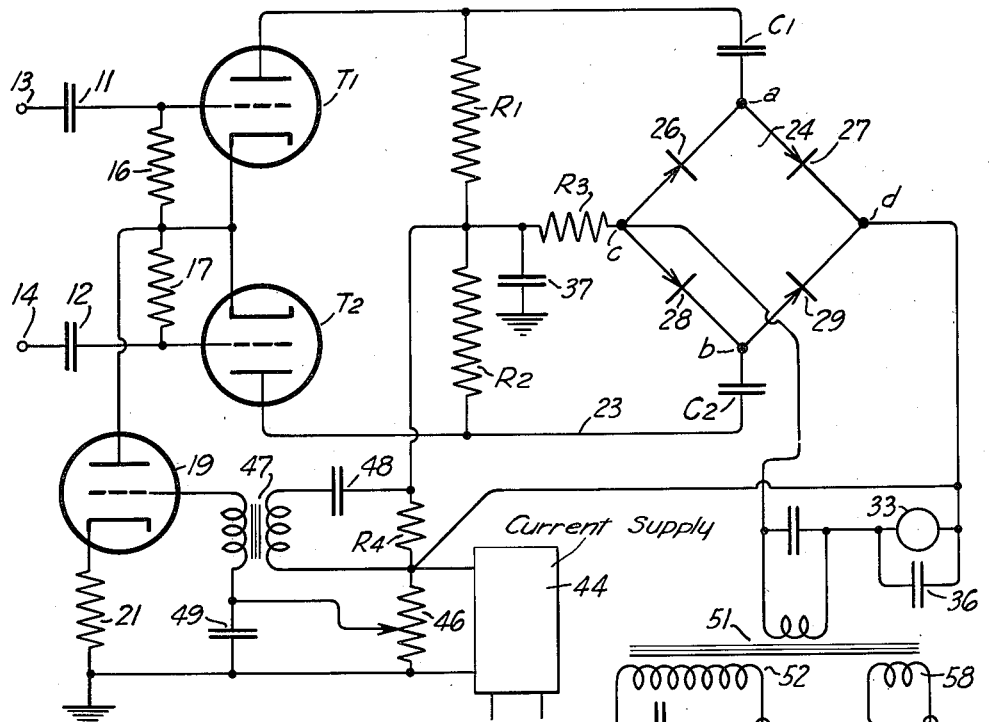
FIG_5_
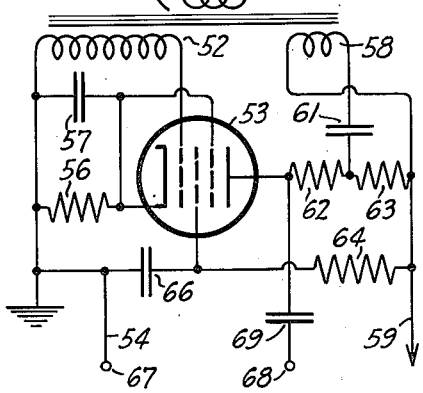
FIG_6_
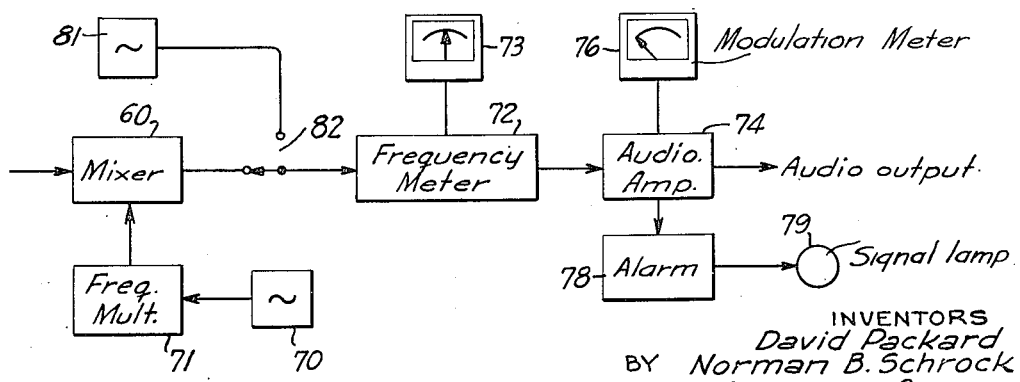

Patented Mar. 4, 1952

2,587,755

UNITED STATES PATENT OFFICE 2,587,755

FREQUENCY MEASURING OR INDICATING APPARATUS

David Packard, Los Altos, and Norman B. Schrock, Palo Alto, Calif., assignors to Hewlett-Packard Company, Palo Alto, Calif., a corporation of California Application March 6, 1948, Serial No. 13,478

6 Claims. (Cl. 250—27)

This invention relates generally to electronic apparatus for indicating or measuring frequencies and to monitoring apparatus which may incorporate the same.

It is an object of the present invention to provide a frequency meter of the electronic type which is relatively accurate and characterized by a high degree of stability and trouble-free performance.

Another object of the invention is to provide a frequency meter well adapted for use in monitoring systems such as are employed for monitoring frequency modulated transmitters.

Another object of the invention is to provide an electronic apparatus for measuring frequency which is dependent upon the values of certain resistors and condensers, and substantially independent of such factors as vacuum tube characteristics, supply voltage, and the like.

Another object of the invention is to provide apparatus for monitoring frequency modulated transmitters which will afford accurate frequency indications or measurements which are independent of such factors as the monitoring power supplied from the transmitter, power supply line voltage variations, tube characteristics, and temperature changes such as are normally encountered in the operation of such equipment.

Another object of the invention is to provide monitoring apparatus which can be used to measure the percentage modulation, and for checking or analyzing the audio-frequency component.

Additional objects of the invention will appear from the following description in which the preferred embodiment has been set forth in detail in conjunction with the accompanying drawing.

Referring to the drawing:

Figure 1 is a circuit diagram illustrating a frequency meter incorporating the present invention.

Figures 2, 3 and 4 are diagrams illustrating the waveform in various portions of the apparatus.

Figure 5 is a circuit diagram illustrating the preferred form of our electrical meter.

Figure 6 is a diagrammatic view illustrating different portions of a complete monitoring system utilizing the present invention.

The frequency meter illustrated in the circuit diagram of Figure 1 comprises a pair of vacuum tubes $T_1$ and $T_2$, which form what can be termed switching tubes. The control grids of these switching tubes are coupled through condensers $11$ and $12$ to the input terminals $13$ and $14$. The cathodes of the tubes are directly connected together, and resistors $16$ and $17$ serve to provide a desired bias upon the control grids.

The source of current for the anodes of the tubes $T_1$ and $T_2$ is represented in this instance by the B battery $18$, together with the current regulating tube $19$. Tube $19$ is a triode or pentode arranged to have sufficient degeneration in its cathode circuit to supply substantially a constant plate current ($I_0$) to either one of the tubes $T_1$ or $T_2$. Thus resistor $21$ is shown connecting the cathode of tube $19$ to ground and to the negative side of battery $18$. The control grid of tube $19$ is tapped to an intermediate point on battery $18$ to provide a desired positive bias to the same. The anode of tube $19$ is conductively connected to the two cathodes of tubes $T_1$ and $T_2$.

The anodes of the switching tubes $T_1$ and $T_2$ are connected to the conductors $22$ and $23$, which form a part of a circuit network including the series connected load resistors $R_1$ and $R_2$ and a full wave rectifier circuit $24$. The rectifier is shown including the rectifier elements $26$, $27$, $28$ and $29$ which are connected in a bridge circuit as illustrated. The rectifier elements are preferably of the germanium crystal type, but other types of elements can be used if desired, such as suitable diodes. Points $a$ and $b$ of the rectifier bridge are connected to the conductors $22$ and $23$, through the charging condensers $C_1$ and $C_2$. Points $c$ and $d$ are connected to the indicating or measuring instrument $33$, which in a typical instance may be a suitable milliammeter or like device of the galvanometer type. Point $c$ of the rectifier is connected through resistor $R_3$, with the midpoint between the load resistors $R_1$ and $R_2$. The point of connection between resistors $R_1$ and $R_2$ is also connected through resistor $R_4$ with the positive side of the battery $18$. Point $d$ on the rectifier bridge is directly connected to the positive side of battery $18$ through conductor $34$. The milliammeter $33$ is shunted by the by-pass condenser $36$, and another by-pass condenser $37$ is shown connecting between ground and the point of connection between resistors $R_1$ and $R_2$. Load resistors $R_1$ and $R_2$ are of like values, and this likewise applies to the charging condensers $C_1$ and $C_2$.

In operating the apparatus of Figure 1 an alternating signal voltage is applied between the terminals $13$ and $14$ and the apparatus operated in such a manner that the device $33$ indicates or measures the signal frequency. As will be presently explained the apparatus is adjusted whereby zero reading of the device $33$ (corresponding to a condition in which no effective current flow occurs through hte same) indicates application of a signal of a given frequency. Readings of device $33$ above or below zero point therefore serve to indicate or measure deviation in frequency above or below a given frequency. For example in one useful application to be presently described in greater detail, a voltage derived from a frequency modulated transmitter is applied to the terminals 13 and 14, and the apparatus adjusted whereby device 33 gives zero reading for the center frequency. Any variation or drift of the center frequency above or below the desired value is indicated or measured by the device 33.

Whatever may be the source of alternating voltage applied to the terminals 13 and 14, it is preferable that it should have a rectangular waveform relatively symmetrical with respect to ground or zero axis. In certain instances this will require suitable apparatus interposed between the source of pulses and the terminals 13 and 14. Thus we may use a phase inverter in order to signal voltage relatively symmetrical with respect to zero axis, and a switching circuit serving to provide a generally rectangular waveform.

Because of the action of the current regulator 19 it is not essential that the signal voltage be balanced to ground as described above. Thus one input terminal (i. e., either 13 or 14) may be grounded and the other driven by the signal. Likewise the apparatus is not critical with respect to the waveform of the signal voltage applied between 13 and 14, provided the amplitude is sufficient for driving the tubes $T_1$ and $T_2$.

Application of voltages of alternating polarity to the terminals 13 and 14 serves to alternately vary the voltages upon the grids of tubes $T_1$ and $T_2$, whereby these tubes are made alternately conductive. Thus when tube $T_1$ is made relatively conductive, tube $T_2$ is cut off or in other words made relatively non-conductive, and conversely when tube $T_2$ is made conductive tube $T_1$ is simultaneously rendered non-conductive. Regulator tube 19 maintains the total D.-C. current to the tubes $T_1$ and $T_2$ substantially constant so that a rectangular waveform is produced substantially as shown in Figure 2. Variations in the length of the current pulses, indicated in Figure 2, correspond with variations in their frequency. Assuming that tube $T_1$ is made conductive, condenser $C_1$ is charged and current flow occurs through the same until the potential difference across this condenser equals the peak voltage between conductors 22 and 23. Condensers $C_1$ and $C_2$ are selected to be of such value that the time constant $R_1C_1$ is sufficiently small to allow the condensers to be substantially fully charged before the end of each half-cycle. Therefore charging current flowing through condensers $C_1$ and $C_2$ is according to a waveform which has been illustrated in Figure 3.

The rectified current produced by the bridge rectifier and flowing through device 33 and bypass condenser 36 between points $c$ and $d$, varies in proportion to variations in the signal frequency. (Note in this connection that condenser 36 is of such value that it by-passes any audio component present.) Assuming that resistors $R_3$ and $R_4$ together with by-pass condenser 37 were not included in the circuit, the relationship between rectified current flow between points $c$ and $d$, and frequency of incoming pulses, can be expressed by an equation as follows:

$$I_s = 2I_0 R_1 C_1 F \qquad \text{Equation 1}$$

where $I_s$ represents the rectified current flow between points $c$ and $d$ through device 33, $I_0$ represents the constant plate current through tube 19, $R_1$ the value of resistor $R_1$, $C_1$ the value of condenser $C_1$, and $F$ the frequency of the pulses.

Assuming now that resistors $R_3$ and $R_4$ are included together with the by-pass condenser 37, as in the circuit of Figure 1, then a certain fraction ($I_b$) of the constant plate current will flow through device 33 to oppose current $I_s$, and by properly proportioning the values of resistors $R_3$ and $R_4$, the current through device 33 can be made to be zero for any particular given frequency within the range for which the apparatus is adapted. In other words, $I_b$ is made equal to $I_s$, for securing zero reading of device 33. The relationship between current $I_b$ and the values of resistors $R_1$ and $R_2$, can be expressed by an equation as follows:

$$I_b = I_0 \frac{R_4}{R_3 + R_4} \qquad \text{Equation 2}$$

Taking into account Equation 1, and assuming that $I_b$ is made equal to $I_s$, then the relationship can be further represented by an equation as follows:

$$2I_0 R_1 C_1 F = I_0 \frac{R_4}{R_3 + R_4} \qquad \text{Equation 3}$$

Equation 3 can be simplified in terms of frequency as follows:

$$F = \frac{R_4}{(R_3 + R_4) 2 R_1 C_1} \qquad \text{Equation 4}$$

In view of Equations 3 and 4 it is evident that the values of resistors $R_3$ and $R_4$ can be adjusted to secure a zero reading and current flow through device 33 for a given frequency of voltage applied to terminals 13 and 14. Therefore it is possible to make resistors $R_3$ and $R_4$ adjustable and to calibrate the same in terms of frequency, in which event device 33 may be simply a zero indicating device. Likewise resistors $R_1$ and $R_2$ or condensers $C_1$ and $C_2$ can be made adjustable and the apparatus similarly calibrated for measuring frequency for zero reading of device 33. It is also possible to provide stepped resistors to facilitate adapting the apparatus to frequency measurements over selected portions of a wide frequency range, the device 33 being calibrated directly for the incremental range.

When one is measuring deviation of a given frequency above or below a desired value, the values of resistors $R_3$ and $R_4$ are adjusted to give zero reading of device 33 for the desired frequency. Assuming that device 33 is an instrument of the galvanometer type, which gives readings upon both sides of a zero base point (representing a condition of no current flow through the same) then variations in the signal frequency above or below the desired value will be indicated, and can be measured.

Our apparatus can be used to indicate the average frequency of a frequency modulated signal, as long as the instantaneous frequency does not exceed the linear range of the apparatus. A particular application of this character is for the purpose of monitoring a frequency modulated transmitter. Thus a frequency modulated signal from a radio transmitter is applied to the terminals 13 and 14. Resistors $R_3$ and $R_4$ are adjusted to give zero reading for device 33 when the center frequency is at its proper value. It is well known that although the instantaneous frequency of a frequency modulated signal will vary above and below the mean or center frequency, the latter ordinarily remains constant. With proper adjustment our apparatus will produce zero reading of the device 33 for the desired center frequency, and will measure deviations of the center frequency above or below its proper value.

Assuming that a frequency modulated signal is applied to the terminals 13 and 14, as derived from an FM transmitter, then the waveform of rectified pulses flowing through device 33 can be illustrated as in Figure 4. Waveform 41 represents rectified current which would flow between points $c$ and $d$ through device 33 and condenser 36, assuming omission of resistors $R_3$ and $R_4$. Assuming application of a frequency modulated signal, line 42 represents the audio component, and horizontal line 43 the effective average current through the device 33. Normally the device 33 would be constructed with sufficient lag to its response to avoid following current variations due to the audio-frequency component. In other words device 33 normally gives a constant reading and irrespective of the audio component present. With use of the resistors $R_3$ and $R_4$ properly adjusted in the manner previously described, the apparatus is adjusted whereby line 43 becomes the zero axis line, symmetrical with the audio waveform 42.

The apparatus described above has a relatively high degree of stability, and will give trouble-free performance independently of factors which might be expected to effect instruments of this type. Because of high stability it is not necessary to make frequent calibration adjustments. It is particularly applicable for monitoring frequency modulated transmitters because it is capable of indicating the center frequency without being affected by the degree of modulation.

Stability and accuracy of the apparatus is attributed to a susbtantial degree to the way in which one can provide for zero reading for a given frequency. The current flow through resistor $R_3$ to secure 0 reading for a particular frequency is from the same battery 18 or source of plate current as is utilized for supplying current to the switching tubes $T_1$ and $T_2$ and is a fixed portion of current $I_0$ (as determined by the relative values of $R_3$ and $R_4$) which is switched by tubes $T_1$ and $T_2$ to produce the current pulses measured by device 33. Therefore if the current flow from the battery varies to any substantial extent, such variations tend to affect both $I_s$ and $I_b$ in such a manner as to nullify any effect on device 33. In this connection it should be noted that while regulator tube 18 tends to maintain current flow constant, small variations may occur due to such factors as changes in temperature, variation in tube characteristics, and the like.

The accuracy and reliability of the apparatus is also relatively independent of tube characteristics, including the characteristics of the tubes $T_1$ and $T_2$. Thus variations in the characteristics of these tubes which may occur from time to time will not require frequent recalibration or readjustment of the apparatus. For example in one commercial model of the invention a change of 20% in the D.-C. supply voltage or a change of 20% in the current regulated by tube 19, or normal variations between commercial tubes used for $T_1$ or $T_2$, will not produce variations of more than 0.05% in the measured center frequency. Thus where the center frequency is 200 kc., the variations would not exceed 100 C. P. S.

Figure 5 illustrates apparatus incorporating certain improvements which can be used to advantage for monitoring frequency modulated transmitters. In many respects the circuit of Figure 5 is the same as Figure 1. In place of the single battery 18, having a tap for biasing the grid of regulator tube 19, a more effective regulating arrangement is employed which tends to reduce spurious modulation of the current $I_o$. A plate current supply is diagrammatically indicated at 44, and consists for example of a conventional alternating current rectifier, together with conventional filter elements to substantially eliminate alternating current ripple. Resistor 46 receives direct current from 44, and may for example be a bleeder resistor across the last element of the filter employed. A small step-up transformer 47 is provided, having its primary connected across resistor $R_4$, in series with blocking condenser 48. The transformer secondary has one terminal connected to the control grid of regulator tube 19, and its other terminal connected to a tap on resistor 46 to provide a proper grid bias. Condenser 49 provides a by-pass to ground. Condenser 37 is of a value sufficient to by-pass the signal frequencies but should not by-pass audio frequencies. With this arrangement any variation in $I_0$ causes a voltage to appear between the grid of tube 19 and ground, and such voltage acts to oppose any change in $I_0$, thus resulting in a form of negative feedback. If more feedback is required than can be obtained by this arrangement, then a voltage amplifier tube can be inserted between the grid of tube 19 and transformer 47.

Various means can be employed to recover the audio modulation component of rectified pulses flowing between points $a$ and $b$. The novel means shown in Figure 5 employes a special transformer 51 with its primary connected in series with the device 33, and its secondary connected to the input of the amplifying vacuum tube 53. This tube can be of the multi-grid type such as one known by manufacturers' specifications as 6SJ7. One side of winding 52 connects with control grid of tube 53, and the other side connects to the grounded conductor 54. Resistor 56 connects between a conductor 54 and the cathode. The cathode is directly connected to the suppressor grid of the tube, and the resistor 56 is shunted by by-pass condenser 57. In order to minimize the input impedance to transformer 51, thus minimizing the impedance between points $c$ and $d$ of the rectifier, the transformer is provided with another secondary winding 58 which is connected in conjunction with the tube 53 to provide negative current feedback. Thus one side of winding 58 is connected to the plate current supply line 59, and the other side is connected through series condenser 61 to the midpoint between resistors 62 and 63. Resistors 62 and 63 are connected in series between the anode and current conductor 59. Resistor 64 provides bias to the second grid of tube 53, and this grid is by-passed to ground by condenser 66. Output terminals 67 and 68 are connected respectively to conductor 54 and to the plate of tube 53 through coupling condenser 69.

The arrangement illustrated in Figure 5 for the control of regulating tube 19, and utilizing the step-up transformer 47, is more effective than the arrangement illustrated in Figure 1. Slight voltage variations which may occur across resistor $R_4$ are passed through transformer 47 to the control grid of tube 19, together with voltage variations applied directly from resistor 46. The output from terminals 67 and 68 can be used for the purpose of checking and analyzing the audio component of the frequency modulated signals. Circuits connected to tube 53 are adjusted whereby the amount of negative current feedback through coil 58 is such as to reduce the impedance of the primary transformer 51 to substantially its ohmic resistance, plus its leakage reactance. Such low impedance facilitates securing the desired accurate readings from device 33, and at the same time provides an amplifier which is relatively free of distortion, which is relatively stabilized with respect to its gain, and which will give distortionless response over a relatively wide audio-frequency range. In addition to the above the transformer coupling serves as convenient filter means to remove the pulse frequency components.

Figure 6 diagrammatically represents a complete monitoring system for monitoring frequency modulated transmitters. Frequency modulated signals from the transmitter are shown being supplied to the mixer 60, where they beat with a constant frequency derived from the temperature controlled crystal oscillator 70, and the frequency multiplier 71. A differential beat frequency from the mixer 60 is supplied to the frequency meter 72, which includes all the essential parts of Figures 1 and 5. As apparatus for modifying the signal before application to the terminals 13 and 14, we may employ a clipping circuit, after which the clipped voltages are supplied to a limiting amplifier. The output of the limiting amplifier is supplied to a phase inverter, which in turn is coupled to the input of a switching circuit utilizing two switching tubes, similar to the tubes T1 and T2 of Figure 1. The output of this switching circuit supplies alternating voltage between terminals 13 and 14 which is substantially symmetrical with respect to zero axis and of generally rectangular waveform. Device 73 represents a device of the galvanometer type which serves to indicate and measure deviation from the desired center frequency. Part of the output from 72 is supplied to the audio amplifier 74, which may include a distortionless type amplifier coupled to the rectifier circuit as illustrated in Figure 5. The audio output from 74 can be used for measurement or monitoring. In the event audio pre-emphasis is used in the transmitter, then suitable means may be utilized to de-emphasize the audio output, thus facilitating a proper check on analysis of the transmitter performance.

Meter 76 can be connected to the amplifier 74 and may serve for the purpose of measuring the percentage modulation. Apparatus 78 represents an alarm connected to the audio amplifier 74 and serving to operate the signal lamp 79. In the event the peak voltage of the audio component rises above a given value at which apparatus 78 is set, then an automatic indication is secured from lamp 79.

In addition to oscillator 72 it is desirable to provide a check oscillator 81 to which the frequency meter 72 can be connected by switch 82. Oscillator 81 can provide a frequency corresponding to the differential center frequency normally supplied from the mixer 60.

We claim:

1. In frequency metering or indicating apparatus, a pair of vacuum switching tubes each having cathode, control and anode elements, coupling means serving to apply current pulses of alternating polarity to the control elements of said tubes whereby the anode-cathode paths of said tubes are rendered alternately conductive and non-conductive, two series connected resistors of substantially equal value directly connected between the anode elements of said vacuum switching tubes, a third resistor, a source of direct current connected from its positive side through said third resistor to the point of connection between said first named equal resistors, a by-pass condenser connected between said point and a point of neutral potential, response means responsive to the average value of unidirectional pulses applied to the same, a full wave rectifying circuit having output terminals connected to deliver unidirectional pulses to said response means, two condensers of substantially equal value, each of said condensers being connected between the anode element of an associated switching tube and an input terminal of said rectifying circuit, said condensers being charged in response to voltages existing across said first named equal resistors and said condensers conducting charging current through said rectifying circuit, said response means having one output terminal thereof directly connected to the positive side of said direct current source, a fourth resistor, said response means having its other terminal connected through said fourth resistor to the aforementioned point of connection between the first named equal resistors, said last named connection to said response means serving to supply direct current from said direct current source to said response means in a direction opposed to the said unidirectional condenser charging current pulses, the magnitude of said opposition current being a fixed portion of the current through said vacuum switching tubes.

2. Apparatus as in claim 1 applicable to frequency modulated current pulses of alternating polarity, and in which two series connected response means are employed, the one means being responsive to the over-all average value of the unidirectional pulses applied to the same, and the other being responsive to variations in the instantaneous average value of said unidirectional pulses.

3. Apparatus as in claim 1 together with current regulating means serving to secure substantially constant current flow from said source of anode current, said means including a vacuum tube having cathode, control and anode elements, and means for applying regulating voltages to the control grid of said tube, said means including a resistor in the anode circuit of said switching tubes, and means for regulating the voltage on the control grid in response to voltage variations across said resistor.

4. In frequency metering or indicating apparatus, a pair of vacuum switching tubes each having cathode, control and anode elements, means serving to couple the control elements of said tubes to a source of current pulses of alternating polarity, whereby the anode-cathode paths of said tubes are rendered alternately conductive, a response means responsive to the average value of unidirectional pulses applied to the same, a full wave rectifying circuit of the bridge type having two points on the same connected to the response means to deliver unidirectional pulses to the latter and having two other points to which pulses are applied for rectification, a circuit network connecting said vacuum switching tubes to said rectifier circuit to supply pulses to the latter, said network including a source of anode current, a connection from the negative side of said source to the cathodes of said switching tubes, two resistors of like value connected serially between the anodes of the switching tubes, a conductive connection between the positive side of the source of anode current and one of said two first named points of the rectifier circuit, a third resistor connecting the other one of said first named points on the rectifier circuit and the point of connection between said resistors, a fourth resistor serving to connect the point of connection between said like resistors, and the positive side of the source of anode current, and a pair of like condensers each connected between the anodes of an associated switching tube and said two other points on the rectifier circuit, said condensers being charged in response to voltage differences across said two like resistors, the aforementioned third and fourth resistors being of such values as to provide zero current flow through said response means for a given frequency of applied pulses.

5. Apparatus as in claim 4 together with means for regulating the anode current to the vacuum switching tubes, said means including a vacuum tube having cathode, control and anode elements, the anode-cathode path of said tube being connected in series with a source of anode current for said switching tubes, a transformer having a secondary connected to supply controlling voltages to the control grid of said tube, and means for coupling the primary of said transformer to said fourth resistance whereby voltage variations across said fourth resistance cause compensating voltage variations of the control grid of the regulating tube.

6. Apparatus as in claim 4 together with current regulating means serving to secure substantially constant current flow from said source of anode current, said means including a vacuum tube having cathode, control and anode elements, and means for applying regulating voltages to the control grid of said tube, said means including a resistance in the anode circuit of said switching tubes, and means for varying the voltage on the control grid in response to voltage variations across said resistance.

DAVID PACKARD.
NORMAN B. SCHROCK.

REFERENCES CITED

The following references are of record in the file of this patent:

UNITED STATES PATENTS

| Number | Name | Date |
|---|---|---|
| 1,809,683 | Fitzgerald | June 9, 1931 |
| 2,119,389 | Hunt | May 31, 1938 |
| 2,358,480 | Skilling | Sept. 19, 1944 |
| 2,362,503 | Scott | Nov. 14, 1944 |
| 2,377,363 | Noble | June 5, 1945 |
| 2,432,390 | Darby | Dec. 9, 1947 |

OTHER REFERENCES

Rev. Sci. Inst., December 1936, pages 450–456, article by Gingrich et al. Copy in 175–368.